United States Patent [19]

Jones

[11] Patent Number: 5,596,022
[45] Date of Patent: Jan. 21, 1997

[54] BLOWING AGENTS FOR PHENOLIC RESINS

[75] Inventor: John E. Jones, Glamorgan, England

[73] Assignee: BP Chemicals Limited, London, England

[21] Appl. No.: 584,930

[22] Filed: Jan. 11, 1996

[30] Foreign Application Priority Data

Jan. 17, 1995 [GB] United Kingdom .................... 9500814

[51] Int. Cl.$^6$ ....................................................... C08J 9/14
[52] U.S. Cl. ............................. 521/131; 521/98; 521/181
[58] Field of Search ............................... 521/98, 131, 181

[56] References Cited

U.S. PATENT DOCUMENTS 5,350,777  9/1994  Yuge et al. ............................... 521/117

FOREIGN PATENT DOCUMENTS 0344537  12/1989  European Pat. Off. .
0439283   7/1991  European Pat. Off. .

OTHER PUBLICATIONS

Abstract of Japanese Patent 3229736 Oct. 11, 1991.

*Primary Examiner*—Morton Foelak
*Attorney, Agent, or Firm*—Brooks Haidt Haffner & Delahunty

[57] ABSTRACT

This invention relates to a process for producing phenolic foams frown phenolic resins using a blowing agent comprising 1,1,1,4,4,4-hexafluorobutane. These blowing agents are much more environmentally friendly than the conventional chlorofluorocarbons and do not adversely affect the properties of the foams produced.

17 Claims, No Drawings

BLOWING AGENTS FOR PHENOLIC RESINS

This invention relates to a phenolic foam produced by using a hexafluorobutane as the blowing agent.

Hitherto chlorofluorocarbons (hereafter "CFCs") have been widely used as blowing agents for producing foams from synthetic resins. Whilst the CFCs perform very efficiently as blowing agents, it has been increasingly causing concern that these agents may have a damaging effect on the environment, especially the depletion of the ozone layer. Thus, there have been great efforts made to identify a substitute for CFCs which will be more user friendly. Such efforts have met with some limited success using CFCs in which one or more of the chlorine atoms has been replaced by hydrogen atoms (hereafter "HCFCs"). Whilst HCFCs are far more environmentally friendly than the CFCs, they nevertheless do not lead to foams of as good physical properties. Most especially, the thermal insulation performance is impaired and physical strength reduced.

In phenolic foams, an effective blowing agent must meet the following criteria:

a. It must not be readily soluble in the resin to be foamed;
b. It should be easy to emulsify in the resin; and
c. It must have a balanced affinity with any surfactant used during the foaming process enabling the surfactant to reside at the interface between the phenolic resin and the blowing agent phases thereby increasing the efficiency of the surfactant.

These criteria are not normally met by conventional HCFCs alone because HCFCs normally used in such a process are more soluble in phenolic resins than CFCs and hence the conventional surfactants produce foam of a coarse, friable structure. Hence the relatively poor performance of the HCFCs as blowing agents when compared with CFCs. It is also known that perfluoroalkanes generally, when used alone, give a poor performance as a blowing agent. In order to overcome the problems with perfluoroalkanes when used alone, our prior published EP-A-0439283 proposed the use of a specific blend of blowing agents such as eg the combination of 1,1,1-dichlorofluoro ethane (sold as HCFC 141b) with a perfluoroalkane such as perfluoropentane so that the properties of the blowing agent in respect of its insolubility in the phenolic resin and hence its foaming properties are more similar to the conventionally used trichlorofluoromethane (sold as CFC 11) and trichlorotrifluoroethane (sold as CFC 113).

It has now been found that the above performance problems can be mitigated by using a specific fluoroalkane which has little or no ozone layer depletion potential but at the same time has a performance comparable with the conventionally used CFCs.

Accordingly, the present invention is a process for producing phenolic foams from phenolic resins using a blowing agent, the improvement comprising using as blowing agent 1,1,1,4,4,4-hexafluorobutane.

By the expression "phenolic resins" as used herein and throughout the specification is meant a resole formed by condensation of one mole of a phenolic compound with 1 to 2.5 moles of an aldehyde suitably in the presence of a base catalyst such as an alkali metal hydroxide eg sodium hydroxide. The phenolic compound can be one or more of phenol itself, the isomeric cresols, nonyl phenol, styrenated phenols, bromo-phenols, catechol, resorcinol or the isomeric xylenols, but is preferably phenol itself or the cresols. The aldehyde used to produce the resole is suitably formaldehyde, acetaldehyde or furfuraldehyde, but is preferably formaldehyde.

For the purposes of the present invention, it will be understood by those skilled in the art that phenolic resins of relatively higher viscosity may be used as the starting materials to produce the foams. It is, however, convenient to use a phenolic resin which inherently contains a compatible solvent and has a viscosity in the range of 1000 to 10,000 centistokes (corresponds to $1\times10^{-3}$ to $1\times10^{-2}$ m$^2$/s), suitably from 1000 to 8000 centistokes (corresponds to $1\times10^{-3}$ to $8\times10^{-3}$ m$^2$/s), preferably from 1000 to 5000 centistokes (corresponds to $1\times10^{-3}$ to $5\times10^{-3}$ m$^2$/s).

The blowing agent used is 1,1,1,4,4,4-hexafluorobutane (hereafter "HFB"). The amount of HFB used is suitably in the range from 1 to 20 parts per 100 parts of the phenolic resin. It is surprising that HFB can be used alone without the need to blend it with any other solvent in order to achieve the optimum performance of CFCs used hitherto, especially in respect of the compressive strength of the foam produced.

The foaming formulation contains in addition to the phenolic resin and the blowing agent a hardener and a surfactant.

The hardener (also known as the curing agent) may be any of the conventional hardeners used for this purpose in this art. The hardener may be an acidic compound which may be organic such as an aryl sulphonic acid eg p-toluene sulphonic acid or xylene sulphonic acid, or, inorganic such as mineral acids eg sulphuric acid or hydrochloric acid. The hardener is suitably used as a aqueous solution containing from eg 50–75% w/w of the acidic compound.

The surfactant (also known as the cell stabilizer) may be any of those conventionally used in this art. For instance, these may be silicones or ether alkoxylates, especially the alkoxylates of castor oil. Castor oil is a glyceride in which glycerol is esterified predominantly with ricinoleic acid. The surfactant is prepared from castor oil as such or from a hydrogenated derivative thereof. The hydrogenated derivative may be either fully or partially hydrogenated with respect to the unsaturation in the ricinoleic acid moiety in castor oil. Thus, castor oil or its hydrogenated derivative can be alkoxylated eg with ethylene oxide or mixtures thereof with propylene oxide and/or butylene oxide. The alkoxylated castor oil derivative suitably contains from 40–80 ethylene oxide units per mole of castor oil.

The foaming process can be operated in the presence of other adjuvants such as viscosity modifiers, lubricants and agents tbr modifying the boiling point of the blowing agent such as glycol, methanol and methylene chloride. These adjuvants may be added either to the resin or to the blowing agent in significant quantities eg up to 20% w/w. The presence of some of these adjuvants can also improve the efficiency of the blowing agent.

The blowing agent is particularly suitable for producing foams having improved properties in respect of water absorption, moisture vapour transmission, stable thermal conductivity values, compression strength and closed cell content such that it has a thermal conductivity value (k) below 0.025 W/m.K. The thermal conductivity value (k) can be measured at 10° C. according to BS 4370, Part 2. The lower the k value, the lower the thermal conductivity and the more desirable the foam.

Thus, according to yet another embodiment, the present invention is a process for producing low-k phenolic foams having a k-value of below 0.025 W/m.K from phenolic resins using as blowing agent 1,1,1,4,4,4-hexafluorobutane.

Low k foams as described above can be produced by the process described above or by conventional processes described for using CFCs as blowing agents. The present invention has the advantage that existing processes using blowing agents comprising CFCs can be readily adapted to using the HFB blowing agent of the present invention. Thus, the methods of producing phenolic foams described in our published EP-A-154452, EP-A-170357, EP-A-223489, EP-A-348199 and EP-A-04392283, and these are incorporated herein by way of reference.

The present invention is further illustrated with reference to the following Examples:

The following Table shows the comparative properties of 1,1,1,4,4,4-hexafluorobutane (HFB), HCFC-141b and trichlorofluoro methane (CFC 11).

TABLE 1

| PROPERTIES | HFB | CFC 11 | HCFC-141b |
|---|---|---|---|
| Formula | $C_4H_4F_6$ | $CFCl_3$ | $CH_2Cl_2F$ |
| Molecular Weight | 166 | 137.8 | 117 |
| Boiling Point (°C.) | 24.6 | 23.8 | 32.0 |
| Gas Phase Thermal Conductivity, 20° C. (W/m.K) | 0.0095 | 0.008 | 0.0098 |
| Ozone Depletion Potential | 0 | 1 | 0.1 |
| Global Warming Potential | 0.015–0.03* | 1 | 0.09 |
| Atmospheric lifetime (years) | ~0.4* | 60 | 11.7 |

*Estimated

EXAMPLE 1

Foams were prepared using a phenolic resin J60/2195L (ex BP Chemicals Ltd), HFB as the blowing agent (according to the invention) and the various other components in the formulation and properties of the foam formed are shown in Table 2 below. In the formulations shown, the amounts of components identified are parts by weight and the curing conditions used were for 2 hours at 60° C. In a comparative test (CT1) not according to the invention the process of Example 1 was repeated using a blend of HCFC-141b and a commercial product (A) rich in perfluoropentane (4:1 in the blend) instead of HFB. The properties of the foam from this process is also shown in Table 2 below:

TABLE 2

| Components & Foam Properties | Example 1 | CT1 |
|---|---|---|
| Phenolic Resin J60/2195L | 100 | 100 |
| Blend of HCFC-141 b: Product A (4:1) | — | 11.9 |
| HFB | 11.9 | — |
| Hardener [50% $H_2SO_4$: $H_3PO_4$ (10:2)] | 10.0 | 10.0 |
| Initial Thermal Conductivity (W/m.K) | 0.0163 | 0.015 |
| Compressive Strength parallel to rise (kPa) adjusted to 40 kg/m³ | 243 | 200 |

The above results show that whilst both HFB and HCFC-141b give excellent low thermal conductivity performance, the compressive strength performance of HFB based foam is far superior to that of the HCFC-141b based foam.

EXAMPLE 2–4

As with Example 1, foams were prepared using various amounts of phenolic resin J60/2196L (ex BP Chemicals Ltd) and HFB blowing agent (according to the invention) and the same formulations as in Example 1 except that the cure conditions were for a shorter duration of 1.5 hours at 60° C. The formulations used and the properties of the foam formed are tabulated in Table 3 below. As previously, the procedure of Example 2 was repeated in a series of comparative tests (CT2–CT4, not according to the invention) using corresponding amounts of a blend of HCFC-141b and a commercial product A rich in perfluoroalkane (4:1) as the blowing agent. The formulations used and the properties of the foam formed are also shown in Table 3 below:

TABLE 3

| Formulation & Properties of Foam | Ex 2 | Ex 3 | Ex 4 | CT2 | CT3 | CT4 |
|---|---|---|---|---|---|---|
| Phenolic Resin J60/2196L | 100.0 | 100.0 | 100.0 | 100.0 | 100.0 | 100.0 |
| Blend of HCFC-14 lb:Product A (4:1) | — | — | — | 9.0 | 10.0 | 11.0 |
| HFB | 9.0 | 10.0 | 11.0 | — | — | — |
| 50% Sulphuric acid hardener | 17.5 | 17.5 | 17.5 | 17.5 | 17.5 | 17.5 |
| Initial Thermal Conductivity (W/m.K) | 0.0173 | 0.0170 | 0.0165 | 0.015 | 0.0147 | 0.0149 |
| Compressive Strength paralleled to rise (kPa) adjusted to 45 kg/m³ | 197 | 189 | 207 | 199 | 180 | 177 |

As with the performance of the block foams in Example 1, it can be seen that the compressire strengths of the laminated foams produced using HFB as the blowing agent are superior to those of the foams produced using conventional blowing agent and at the same time there is no material loss in the insulation properties of the foam.

I claim:

1. A process for producing phenolic foams from phenolic resins, the improvement which comprises foaming said resin using 1,1,1,4,4,4-hexafluorobutane as a blowing agent 1,1,1,4,4,4-hexafluorobutane.

2. A process according to claim 1 wherein the phenolic resin is a resole formed by condensation of one mole of a phenolic compound with 1 to 2.5 moles of an aldehyde suitably in the presence of a base catalyst such as an alkali metal hydroxide eg sodium hydroxide.

3. A process according to claim 2 wherein the phenolic compound is one or more of phenol itself, the isomeric cresols, nonyl phenol, styrenated phenols, bromo-phenols, catechol, resorcinol and the isomeric xylenols.

4. A process according to claim 2 wherein the aldehyde is formaldehyde, acetaldehyde or furfuraldehyde.

5. A process according to claim 1 wherein the phenolic resin inherently contains a compatible solvent and has a viscosity in the range of 1000 to 10,000 centistokes (corresponds to $1\times10^{-3}$ to $1\times10^{-2}$ m²/s).

6. A process according to claim 1 wherein the blowing agent 1,1,1,4,4,4-hexafluorobutane is used in an amount in the range from 1 to 20 parts per 100 parts of the phenolic resin.

7. A process according to claim 1 wherein phenolic resin and the blowing agent are present in a foaming formulation which contains in addition a hardener and a surfactant.

8. A process according to claim 7 wherein the hardener is an acidic compound which is organic or inorganic and is used as an aqueous solution containing from 50–75% w/w of the acidic compound.

9. A process according to claim 7 wherein the hardener is an aryl sulphonic acid selected from p-toluene sulphonic acid and xylene sulphonic acid.

10. A process according to claim 7 wherein the hardener is an inorganic or mineral acid selected from sulphuric acid and hydrochloric acid.

11. A process according to claim 7 wherein the surfactant is a silicone or an ether alkoxylates.

12. A process according to claim 7 wherein the surfactant is an alkoxylates of castor oil.

13. A process according to claim 7 wherein the surfactant is an alkoxylate of ricinoleic acid present in castor oil or a wholly or partially hydrogenated derivative thereof with respect to the unsaturation in the ricinoleic acid moiety.

14. A process according to claim 1 wherein the surfactant is castor oil or its hydrogenated derivative alkoxylated with ethylene oxide or mixtures thereof with propylene oxide and/or butylene oxide.

15. A process according to claim 14 wherein the alkoxylated castor oil derivative contains from 40–80 ethylene oxide units per mole of castor oil.

16. A process according to claim 1 wherein the foams produced have a thermal conductivity value (k) below 0.025 W/m.K as measured at 10° C. according to BS 4370, Part 2.

17. A process for producing from phenolic resins a phenolic foam having a thermal conductivity value (k) below 0.025 W/m.K as measured at 10° C. according to BS 4370, Part 2, the improvement which comprises using 1,1,1,4,4,4-hexafluorobutane as a blowing agent.

* * * * *

UNITED STATES PATENT AND TRADEMARK OFFICE
CERTIFICATE OF CORRECTION

PATENT NO. : 5,596,022
DATED : January 21, 1997
INVENTOR(S) : JOHN E. JONES

It is certified that error appears in the above-indentified patent and that said Letters Patent is hereby corrected as shown below:

Col. 2, l. 45, should read "agents for modifying"

Table 3, line 4, should read "Blend of HCFC -141 b:"

Signed and Sealed this

Eighth Day of July, 1997

Attest:

Attesting Officer

BRUCE LEHMAN

Commissioner of Patents and Trademarks